United States Patent
Singh et al.

(10) Patent No.: US 10,699,237 B2
(45) Date of Patent: Jun. 30, 2020

(54) GRAPHICAL USER INTERFACES FOR DYNAMIC INFORMATION TECHNOLOGY PERFORMANCE ANALYTICS AND RECOMMENDATIONS

(71) Applicant: ServiceNow, Inc., Santa Clara, CA (US)

(72) Inventors: Manjeet Singh, Milpitas, CA (US); Abhay Kulkarni, Santa Clara, CA (US); Amanjit Johal, Foster City, CA (US); Mohammed Abdul Farhan Khan, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 238 days.

(21) Appl. No.: 15/786,398

(22) Filed: Oct. 17, 2017

(65) Prior Publication Data

US 2019/0102719 A1  Apr. 4, 2019

Related U.S. Application Data

(60) Provisional application No. 62/568,087, filed on Oct. 4, 2017.

(51) Int. Cl.
*G06Q 10/06* (2012.01)
*H04L 12/24* (2006.01)
(Continued)

(52) U.S. Cl.
CPC ..... *G06Q 10/06393* (2013.01); *G06F 3/0482* (2013.01); *G06F 3/0483* (2013.01);
(Continued)

(58) Field of Classification Search
None
See application file for complete search history.

(56) References Cited

U.S. PATENT DOCUMENTS 7,716,592 B2   5/2010   Tien et al.
8,200,527 B1   6/2012   Thompson et al.
(Continued)

OTHER PUBLICATIONS

Extended European Search Report for European Application No. 18198153.1 dated Feb. 13, 2019; 7 pgs.

*Primary Examiner* — Abdullah Al Kawsar
*Assistant Examiner* — David V Luu
(74) *Attorney, Agent, or Firm* — Fletcher Yoder PC

(57) ABSTRACT

An embodiment may involve receiving respective information technology performance data related to managed networks. The embodiment may further involve transmitting a web-based representation of a first graphical user interface. The first graphical user interface may be configurable to display a plurality of performance metrics related to the managed network. The embodiment may further involve receiving an indication to display a detailed representation of a particular performance metric of the plurality of performance metrics. The embodiment may further involve transmitting a web-based representation of a second graphical user interface. The second graphical user interface may be configured to display (i) a textual description of the particular performance metric, (ii) the value of the particular performance metric, (iii) an ordered ranking, (iv) a graph-based representation of the particular performance metric as measured over a time period, and (v) a recommendation of operational modifications to improve the particular performance metric.

18 Claims, 14 Drawing Sheets

(51) Int. Cl.
*G06F 3/0482* (2013.01)
*G06F 3/0483* (2013.01)
*G06F 9/451* (2018.01)
*G06F 16/2457* (2019.01)

(52) U.S. Cl.
CPC ........ *G06F 9/451* (2018.02); *G06F 16/24578* (2019.01); *H04L 41/22* (2013.01); *H04L 41/5009* (2013.01); *H04L 41/5025* (2013.01); *H04L 41/5032* (2013.01); *H04L 41/5067* (2013.01)

(56) References Cited

U.S. PATENT DOCUMENTS

| | | |
|---|---|---|
| 9,396,483 B2 | 7/2016 | Hamedi |
| 2005/0028158 A1* | 2/2005 | Ferguson ............... G06F 9/542 718/100 |
| 2010/0179889 A1* | 7/2010 | Johnsmeyer ......... G06Q 10/087 705/28 |
| 2012/0120078 A1 | 5/2012 | Hubbard |
| 2014/0071158 A1* | 3/2014 | Opitz ............... G06Q 10/06393 345/619 |
| 2014/0282257 A1* | 9/2014 | Nixon .................... G05B 11/01 715/835 |
| 2015/0112700 A1* | 4/2015 | Sublett ............ G06Q 10/06393 705/2 |
| 2015/0169733 A1 | 6/2015 | Motamedi et al. |
| 2015/0347951 A1* | 12/2015 | Tamblyn ............ G06Q 30/0631 705/7.39 |
| 2016/0162841 A1* | 6/2016 | Albright ............ G06Q 10/1053 705/321 |
| 2016/0279510 A1* | 9/2016 | Russo ..................... A63F 13/27 |
| 2016/0335580 A1* | 11/2016 | Jones .................... G06F 16/248 |
| 2017/0053225 A1* | 2/2017 | Brummet ......... G06Q 10/06393 |
| 2017/0083572 A1 | 3/2017 | Tankersley et al. |

* cited by examiner

| Executive ˅ 602 | | | |
|---|---|---|---|
| Service ˅ 604 | Audit ˅ 606 | | |
| Customer Experience | Performance | Risk Map 608 | |

600

Customer Satisfaction Score 610
Real time
7.2

Incident Backlog 612
Real time
421

Avg. Resolution Time of Incidents 614
Apr. 20, 2017
3.04 days
˅0.26 (-7.9%) Apr. 19, 2017: 3.29 days

% New P1 Incidents 616
Real time
6.8%

% New Critical Problems 618
Real time
19.7%

% Overdue Requests 620
April 2017
14.07%
˄1.96 (16.2%) March 2017: 12.11%

Benchmarks 621

FIG. 6A

| ≡ | Agent ˅ | 802 | | | | | 800 |
|---|---|---|---|---|---|---|---|
| My Work | My Group's Work | Service Desk KPIs | | 804 | | | |
| 812 Number | Description | Category | Priority | Service | Opened | | 814 |
| 812a INC07365 | Sales app not accessible | Software | 1 – Critical | Purchase History | 2017-03-30 | | Critical Incidents<br>38 |
| 812b INC09261 | Service is down | Inquiry/Help | 1 – Critical | Management | 2017-03-21 | | |
| 812c INC06751 | Management app is running slow | Software | 1 – Critical | Billing | 2017-02-13 | | Open Incidents<br>123 |
| 812d INC06747 | Stolen mobile phone | Request | 2 – High | Loyalty Club | 2017-04-20 | | |
| 812e INC09010 | Weather app is not working | Inquiry/Help | 2 – High | Billing | 2017-01-16 | | Open Requests<br>9,512 |
| 812f INC08265 | Password problem | Request | 2 – High | Management | 2017-04-11 | | |
| 812g INC04426 | Scanner errors | Hardware | 3 – Moderate | Purchase History | 2017-02-08 | | Open Problems<br>252 |
| 812h INC10067 | Cloud services are down | Inquiry/Help | 3 – Moderate | Loyalty Club | 2017-03-14 | | |
| 812i INC06911 | Computer troubles | Hardware | 3 – Moderate | Billing | 2017-01-04 | | |
| 812j INC05064 | Database error | Cupertino | 4 - Low | Billing | 2017-05-01 | | |

FIG. 8B

GRAPHICAL USER INTERFACES FOR DYNAMIC INFORMATION TECHNOLOGY PERFORMANCE ANALYTICS AND RECOMMENDATIONS

CROSS-REFERENCE TO RELATED APPLICATION

This application claims priority to U.S. provisional patent application No. 62/568,087, entitled "Platform Computing Environment and Functionality Thereof," filed Oct. 4, 2017, which is hereby incorporated by reference in its entirety.

BACKGROUND

Managed networks may refer to various types of computer networks that can be remotely administered. This management may involve one or more server devices disposed within a remote network management platform collecting information about the configuration and operational states of computing devices in the managed network, and then presenting representations of this information by way of one or more graphical user interfaces. The user interfaces may be, for instance, web-based user interfaces.

Some of the collected information may relate to key performance indicators (KPIs). KPIs include any sort of measurement, reading, or data that is relevant to the managed network. Traditionally, these KPIs are limited and do not provide information that is detailed and specific enough to improve the managed network.

SUMMARY

Network managers that service a managed network may have difficulty obtaining relevant KPIs to improve their workflow and facilitate analysis of technical problems that occur in the managed network. Even after the network managers obtain relevant KPIs, they might not know how best to alter their services to improve these KPIs. Additionally, the network managers may have difficulty comparing the KPIs of their network to other managed networks because KPIs of other managed networks are not readily available. Thus, it may be desirable for those network managers to use a computing system that gathers data relating to KPIs from a number of managed networks. The computing system may be able to display KPIs and rankings of those KPIs pertaining to each managed network from which it has gathered data. This may be beneficial for managed networks because it allows a managed network to compare its KPIs to related KPIs without a managed network having to ask other managed networks for their KPI data.

For instance, the computing system may gather raw data through a performance analytics engine and provide one or more graphical user interfaces to allow network managers to view their in-depth KPIs. These graphical user interfaces may be visualized as dashboards that are user-configurable. The dashboards may provide network managers (i) KPIs related to their services on the managed network, (ii) rankings comparing their services to those of other managed networks, and (iii) recommendations that indicate services the network managers can implement to improve their KPIs.

Such dashboards may increase the transparency of certain services the managed network may provide, allowing network managers to (i) pinpoint bottle necks and/or areas of poor performance, and (ii) take action to improve their service to the managed network. These dashboards may also allow network managers to implement new services and track the effect that the new services have on their KPIs in near real-time.

The dashboards may have capabilities to allow network managers to view in-depth KPIs at various levels. This may allow network managers to view the KPIs most relevant at a particular level of concern. For example, network managers may include all individuals servicing a managed network, which may further include executives, managers, and agents, all of which service the managed network in different ways. Executives of the network managers may handle high-level service concerns and assign network management tasks for managers and agents to carry out. Managers may handle oversight of specific service groups as well as assign tasks to agents that are a part of the service group they are overseeing. Agents may handle day-to-day maintenance of specific aspects of the managed network.

The dashboards may customize the KPIs based on the particular level of the viewer. In one example, if an agent is viewing the dashboard, the agent might see KPIs related to his or her own work and/or his or her group's work. In another example, if a manager is using the dashboard, the manager might see the KPIs related to the service group the manager is tasked with overseeing. In yet another example, if an executive is using the dashboard, the executive may see KPIs relating to service of the entire managed network, such as an incident backlog and an overall customer satisfaction score. Using this information, network managers may have a better understanding of their work flow or the work flow of all levels of service on the managed network.

The dashboards may have also capabilities to allow network managers to compare their KPIs to those of other managed networks. For example, the dashboards may provide network managers benchmark information including percentile rankings (e.g., $91^{st}$ percentile in overall customer satisfaction). To accomplish this, the computing system may aggregate the KPIs for multiple managed networks and display them in the dashboards.

The dashboards may also provide network managers with recommendations to improve their KPIs. Specifically, the dashboards may provide specific suggestions based on the managed network's KPIs or percentile rank of its KPIs. For example, the network managers may an average time to resolve a high priority incident of 5 hours. The computing system may recommend, via the dashboards, that the network managers implement a service such as "on-call scheduling," which may notify agents of new incidents more quickly, resulting in faster resolution.

Accordingly, in a first example embodiment, a system may include a plurality of computational instances, provided by a remote network management platform, each of which is communicatively coupled and dedicated to a respective managed network. The managed networks may be controlled by different entities. The computational instances may be configured to (i) receive respective information technology performance data related to the respective managed networks, and (ii) based on the respective information technology performance data, calculate respective performance metrics related to efficacy of information technology performance for the respective managed networks.

The system may also include a particular computational instance of the plurality of computational instances that is communicatively coupled and dedicated to a particular managed network. A server device of the particular computational instance may be configured to transmit, to a client device related to the particular managed network, a web-based representation of a first graphical user interface. The first graphical user interface may be configurable to display a plurality of performance metrics of the particular managed network. Display of a particular performance metric of the performance metrics may include a value of the particular performance metric and an ordered ranking that compares the value of the particular performance metric with values of related performance metrics from one or more other computational instances in the plurality of computational instances.

The server device may also be configured to receive, from the client device, an indication to display a detailed representation of the particular performance metric. The server device may also be configured to transmit, to the client device, a web-based representation of a second graphical user interface. The second graphical user interface may be configured to display (i) a textual description of the particular performance metric, (ii) the value of the particular performance metric, (iii) the ordered ranking, (iv) a graph-based representation of the particular performance metric as measured over a time period, and (v) a recommendation of operational modifications applicable to the particular managed network to improve the particular performance metric. The recommendation may be based on the value of the particular performance metric or the ordered ranking.

In a second example embodiment, a method may include various steps for carrying out each of the operations of the first example embodiment.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts a dashboard showing KPIs at a first level, in accordance with example embodiments.

FIG. 8B depicts a dashboard also showing KPIs at the third level, in accordance with example embodiments.

DETAILED DESCRIPTION

Figure 1:
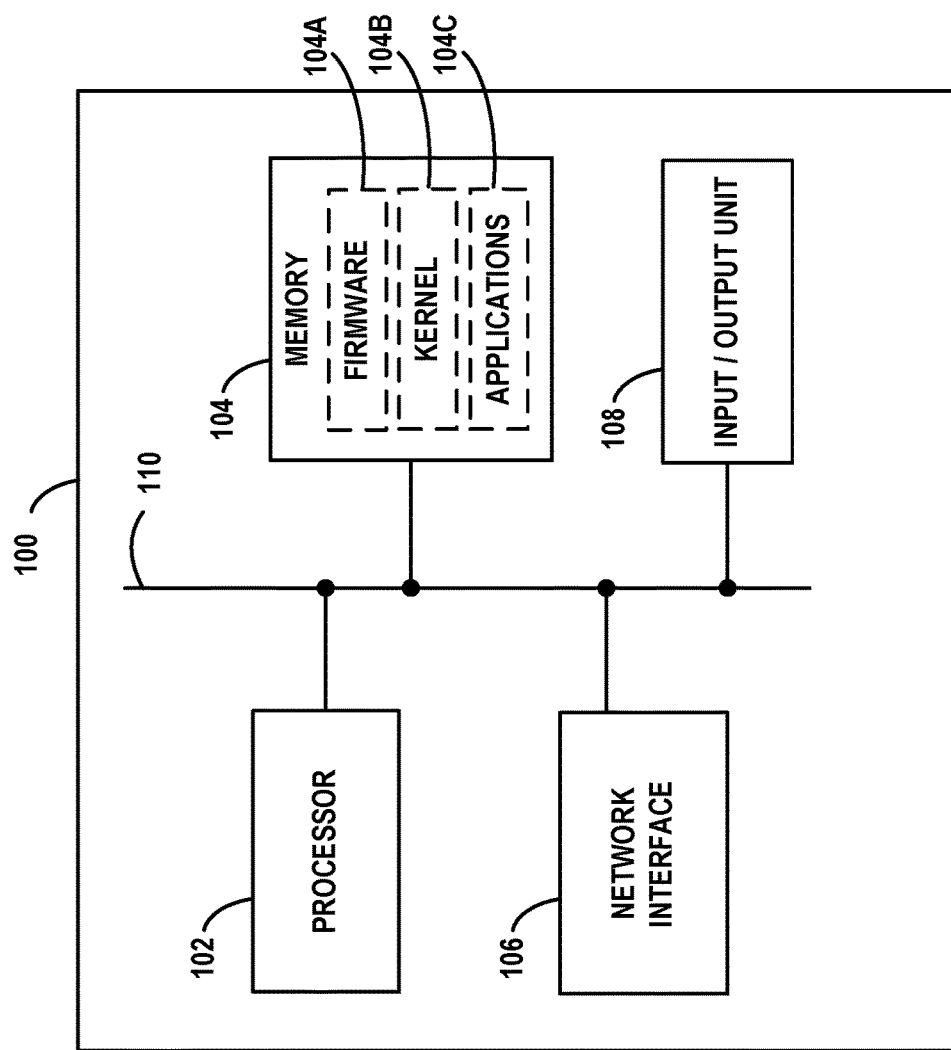
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
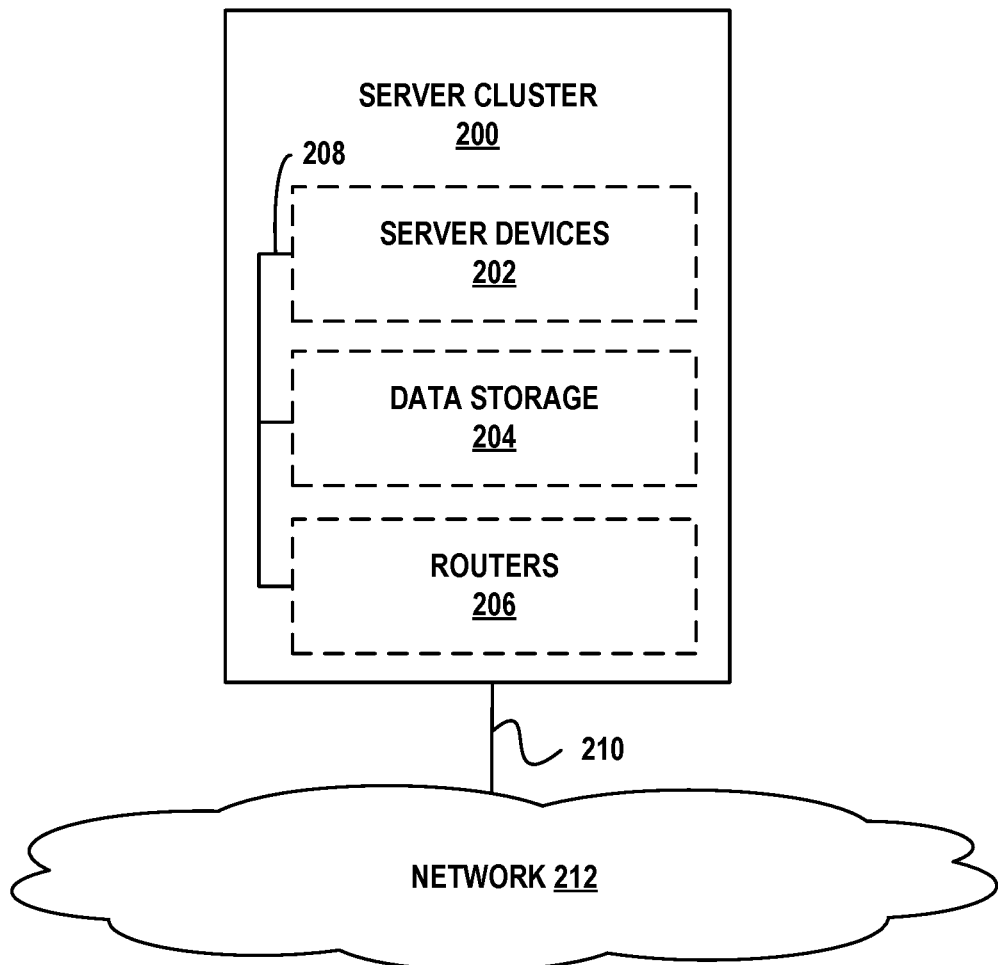
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
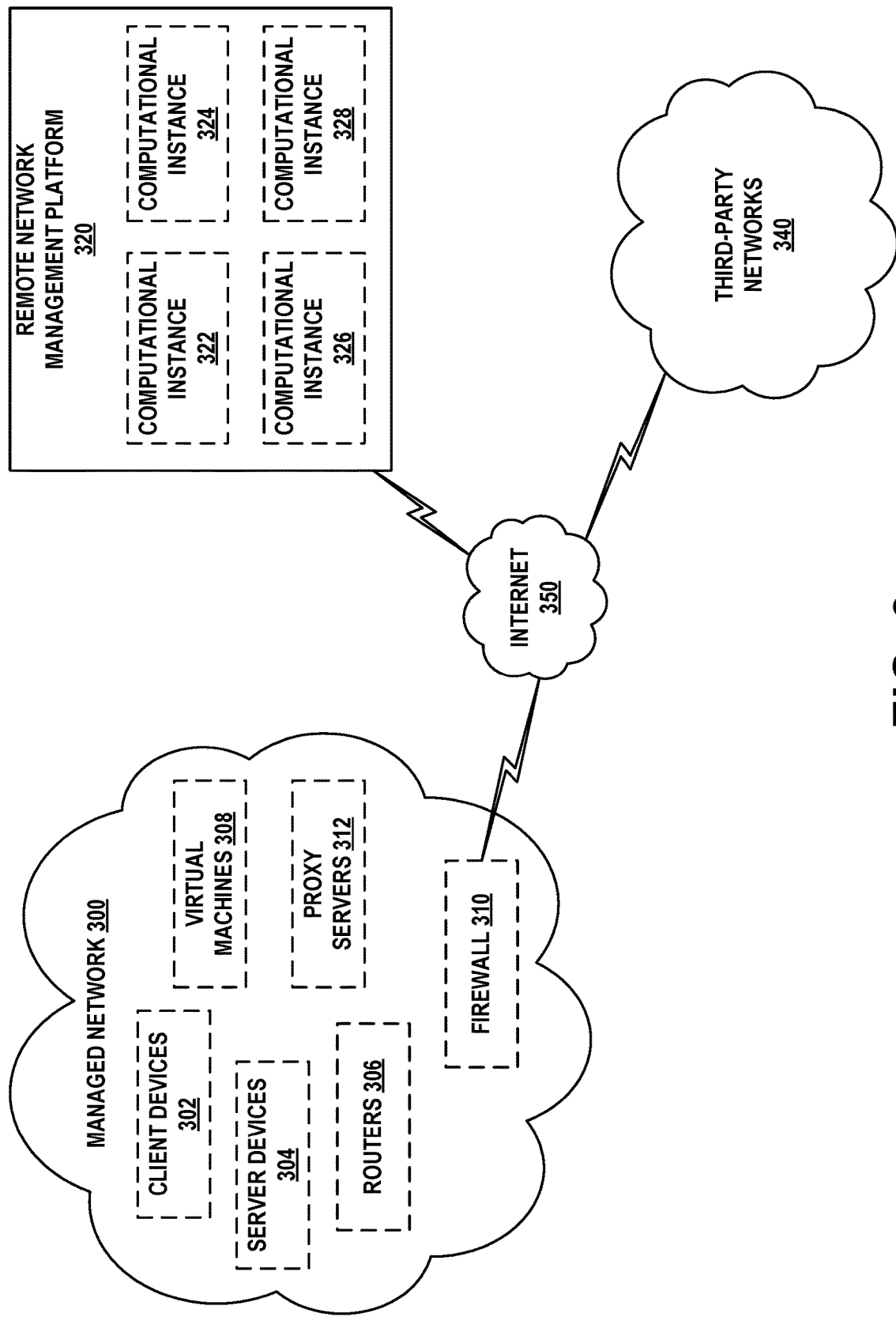
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
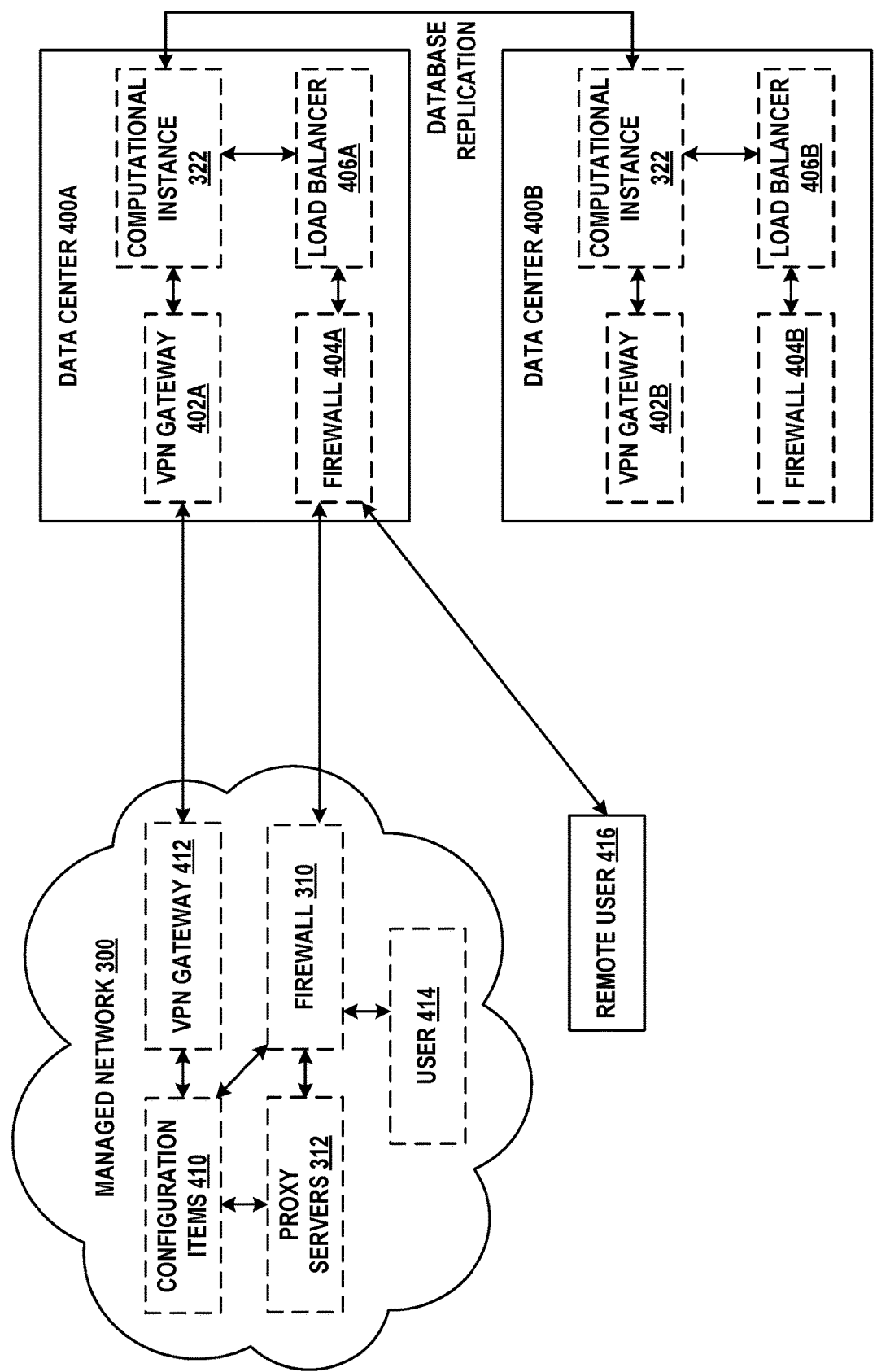
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
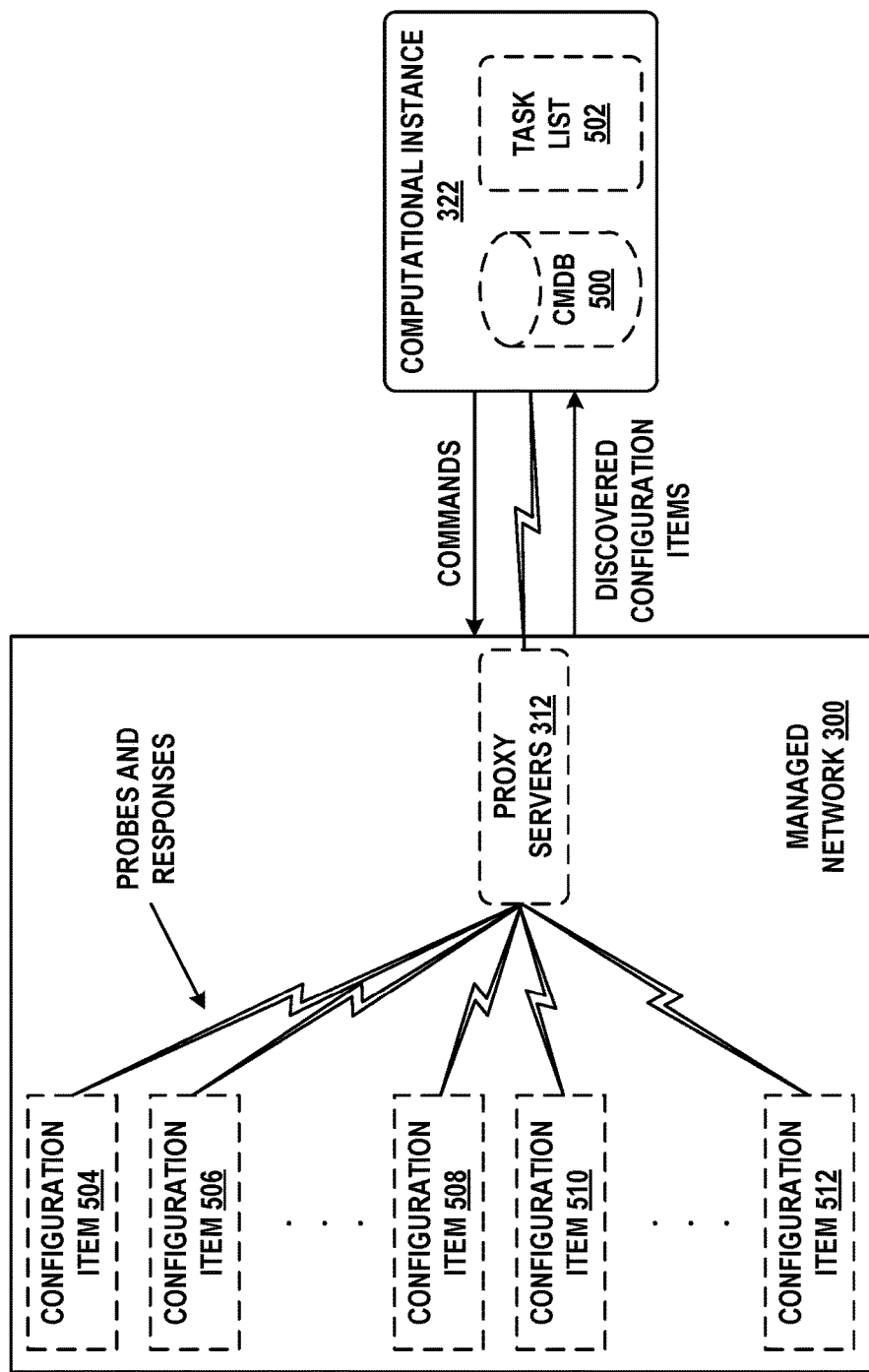
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
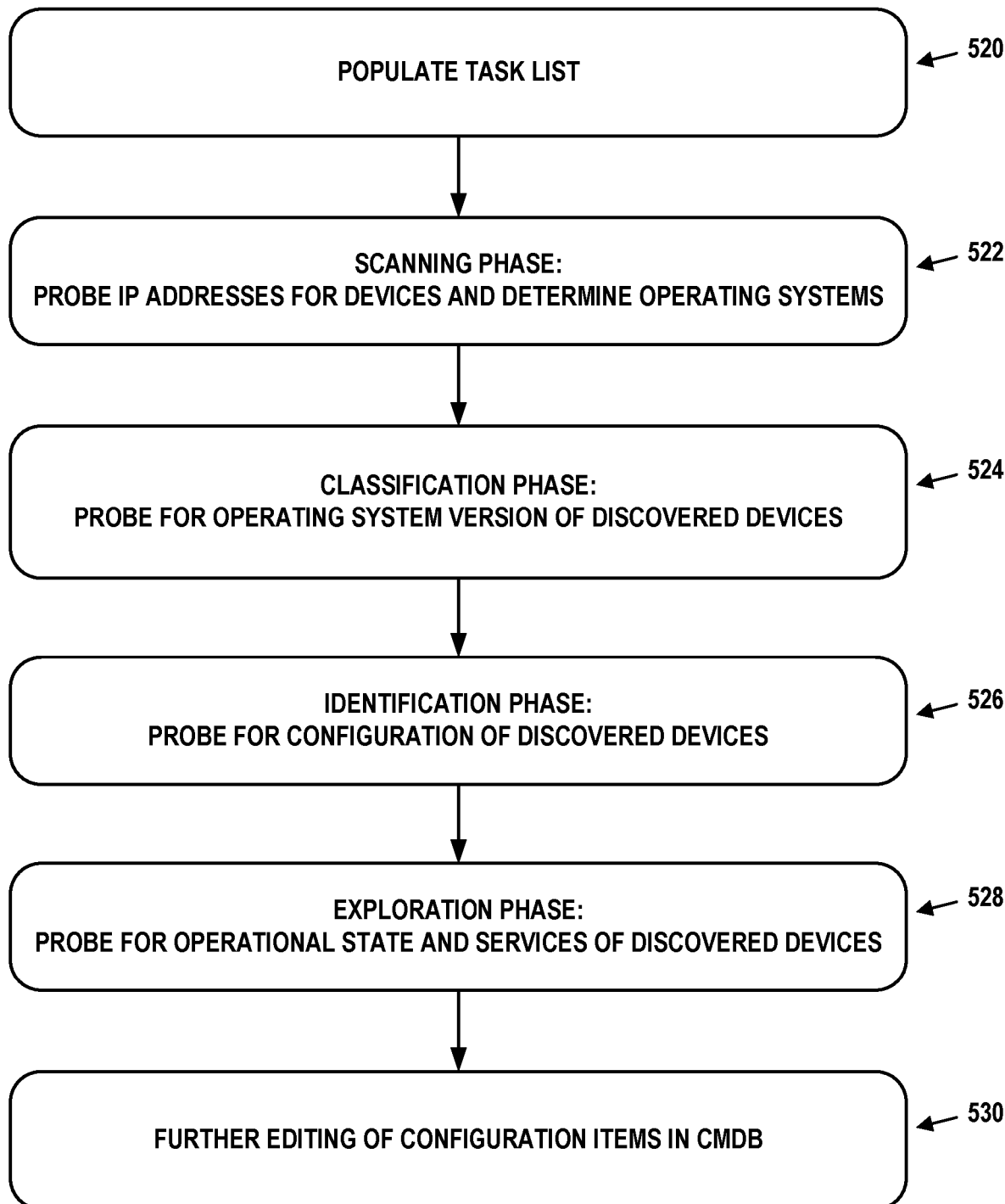
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE DASHBOARDS

As described herein, the term "dashboard" may refer to a graphical user interface (GUI) component that contains one or more tabs. Dashboards may also be referred to as "performance analytics dashboards." In some embodiments, a dashboard may be equivalent to or contained within a GUI window. Tabs may be graphical control elements that allow multiple documents or panels to be contained within a single dashboard. Tabs may be used to switch between such documents or panels. The dashboards may also include scorecards, which may be graphical representations including details regarding KPIs.

The GUIs and/or dashboards may be provided to users when they access a computational instance on a remote network management platform, such as computational instance 322 within remote network management platform 320 as described in FIG. 3. Remote network management platform 320 may automatically collect KPI data from managed networks and store the data in a database.

As previously discussed, managed network 300 may be operated by various employees, including executives, managers, and agents. Each employee is assigned specific tasks related to operating the managed network. For example, an executive might be tasked with the overall performance of the managed network, which may include allocating tasks for managers to complete and/or oversee. A manager might be tasked with overseeing specific aspects of the managed network (e.g., one manager for overseeing security incidents and another manager for overseeing hardware incidents). An agent might be assigned to complete the low-level maintenance for the managed network (e.g., replacing malfunctioning hardware, installing software, etc.).

The dashboards described herein assist the network managers with operating the managed network by providing specialized KPIs based on the various levels of service provided by the network managers. The network managers (e.g., executives, managers, and agents) may be presented with different dashboards with different KPIs depending on the types of services they oversee. This may be beneficial because it allows the different network managers to focus on the KPIs relevant to the services they provide and improve their operation of the managed network.

Example dashboards are shown in FIGS. 6A, 6B, 6C, 6D, 7, 8A, and 8B. The example dashboards in FIGS. 6A, 6B, 6C, and 6D represent dashboards that may be accessible by an executive. These dashboards may present an executive of the network managers the information necessary to improve the overall service provided by the network managers (e.g., customer satisfaction scores, percent of incident requests that are overdue, etc.).

Dashboard 600 of FIG. 6A includes drop down menus 602, 604, and 606, tabs 608, scorecards 610, 612, 614, 616, 618, and 620, and benchmarks button 621. Drop down menus 602, 604 and 606 assist the user with navigating dashboard 600.

Drop down menu 602 allows a user with permissions to select the level of employee for which to display a dashboard. Drop down menu 602 includes options such as "Executive," "Manager," and "Agent." The permissions may be configurable to allow certain levels of employees to view the KPIs for the other levels of employees. For instance, the permissions may grant an executive of the network managers the ability to select any of "Executive," "Manager," or "Agent." Similarly, the permissions may grant a manager of the network managers the ability to select "Manager" or "Agent in drop down menu 602. An agent of the network managers might have the ability to select "Agent," or might not be able to make a selection in drop down menu 602. In operation, if an executive is accessing dashboard 600 selects "Executive" from drop down menu 602, dashboard 600 is displayed. If the executive selects "Manager" or "Agent," a dashboard such as one shown in FIG. 7 or 8A/B is displayed.

Drop down menu 604 allows a user to select the types of scorecards 610, 612, 614, 616, 618, and 620 that are displayed to the user. Drop down menu 604 includes selections such as "service," "incident category," and "assignment group." This may be beneficial when servicing a large managed network that has multiple divisions of network managers. Drop down menu 604 may allow the user to drill-down and display KPIs for these groups. Services may include the different departments within the managed network, such as "audit," "billing," "research," "loyalty club," etc. Incident categories may include the different categories of problems the managed network may encounter, such as "software", "hardware," "network," "database," or "request." Assignment groups may include customized groups that are different depending on the type of managed network. Drop down menu 604 may include different selections that are customized based on the needs of the managed network.

Drop down menu 606 allows a user to filter the selection made in drop down menu 604 by presenting the user with additional selections based on the user's selection in drop down menu 604. For example, if a user selects "Service" in drop down menu 604, drop down menu 606 may display selections such as "audit," "billing," "research," and "loyalty club." As with drop down menu 604, drop down menu 606 may be customizable based on the needs of the managed network.

Tabs 608 include selectable tabs that allow a user to view different variations of dashboard 600. Tabs 608 include a "Customer Experience" tab, "Performance" tab, and a "Risk Map" tab. As shown in FIG. 6A, the "Customer Experience" tab displays scorecards 610, 612, 614, 616, 618, and 620. In operation, if the user selects the either the "Performance" or "Risk Map" tabs, dashboard 600 may display different scorecards or information.

Scorecards 610, 612, 614, 616, 618, and 620 include representations of KPIs relating to the selections from drop down menus 602, 604, and 606. As previously discussed KPIs include indicators relating to efficacy of the IT services of managed network 300. KPIs may relate to incidents and/or problems among other possible categories. Incidents may involve an acute issue (e.g. a computer crashing, a user being unable to log on to a service, etc.) that may be resolved by network managers. Problems may involve a systemic issue (e.g., network outages, poor wireless connectivity, etc.) affecting managed network 300. The incidents and/or problems may be assigned a priority level. Priority levels may include priority one, critical, high, moderate, low and planning priorities. Priority one incidents and/or problems may require immediate attention because they pose a threat to managed network 300. Critical, high, moderate, low, and planning priority incidents and/or problems may relate how the incidents and/or problems are positioned on a task list for the network managers.

Although not all are shown in FIG. 6A, the KPIs that may be displayed in scorecards 610, 612, 614, 616, 618, and 620 include, but are not limited to, a percent of high priority incidents resolved, the average time to resolve a high priority incident, the average time to resolve an incident, the percent of incidents resolved on first assignment, the number of incidents per user, the percentage of incidents that were reopened, the percent of incidents resolved that fall within a service-level agreement (SLA), the percent of high priority problems, the average time to close a problem, the percentage of incidents resolved by a problem, the percentage of emergency change types, the average time to close a change type, the percentage of failed changes, the average time to fulfill a request, the percentage of closed requests that breached a service-level agreement, the number of requests per user, the number of knowledge base views per user, the percentage of incidents resolved by a knowledge base article, an average overall customer satisfaction score, and/or the number of requestors per fulfiller.

Scorecards 610, 612, 614, 616, 618, and 620 may be graphical representations within dashboard 600 that include additional information for a KPI such as (i) the time range of the KPI, (ii) the KPI value, and (iii) KPI trends. The time range of the KPI relates to the period of time in which the KPI applies (e.g., the KPI over the previous year). The KPI value represents the value of the KPI being represented (e.g., 7.2 for an overall customer satisfaction score). The KPI trends relate to the trend of the KPI value over a particular time (e.g., a KPI value increasing by 16% over a previous year's KPI value).

Scorecard 610 includes information relating to the KPI for the customer satisfaction score. Customer satisfaction score may be an aggregation of reviews customers have submitted based on services provided. Customer satisfaction score may be on a scale from 1-10, although other calculations of customer satisfaction score may exist. Scorecard 610 includes a customer satisfaction score of 7.2 out of 10 that is shown in real time.

Scorecard 612 includes information relating to the KPI for the incident backlog. The incident backlog may be the total number of incidents not yet resolved that are assigned to the network managers. Scorecard 612 indicates there are 421 unresolved incidents in the incident backlog for "Audit" service customers. Scorecard 612 also indicates the 421 unresolved incidents are in real-time as of the user accessing dashboard 600.

Scorecard 614 includes information relating to the KPI for the average resolution time of incidents. Scorecard 614 indicates the average time resolution for incidents opened by "Audit" service customers is 3.04 days. The information on scorecard 614 is up-to-date as of Apr. 20, 2017. Scorecard 614 also displays the trend of the average time resolution, showing that since Apr. 19, 2017 (e.g., one day before the data displayed), the average resolution time for incidents has gone down by 0.26 days, or down 7.9%.

Scorecard 616 includes information relating to the KPI for the percentage of new priority one (P1) incidents over a period of time (e.g., over the previous week, month, and/or year). The percentage of new priority one incidents may include the percentage that newly opened incidents are assigned as critical priority. Scorecard 616 indicates 6.8% of newly opened incidents are assigned critical priority.

Scorecard 618 includes information relating to the KPI for the percentage of new critical problems. As previously discussed, incidents may relate to acute service needs (e.g., a broken cellular phone), problems may relate to service problems that may require additional analysis and troubleshooting by the network managers (e.g., sporadic network outages). Scorecard 618 indicates 19.7% of opened problems over a time period are assigned critical priority.

Scorecard 620 includes information relating to the KPI for the percentage of overdue requests. The percentage of overdue requests may be the percentage of requests that are not resolved in a predefined amount of time. The predefined amount of time may be based on an average expected amount of time to fulfill requests or a service-level agreement. Scorecard 620 indicates 14.07% of opened requests are overdue. Scorecard 620 also indicates the percentage of overdue requests is for the month of April 2017. Scorecard 620 further indicates the 14.07% of overdue requests is up 1.96 (or 16.2%) from the 12.11% of overdue requests in the month of March 2017.

As previously discussed, a user can select a particular scorecard, which may display a window with more information about the scorecard. For example, if a user selects scorecard 612, dashboard 600 may display a window with information such as chart displaying how the incident backlog has increased or decreased over time, a breakdown of the incident backlog by incident group, a list of all incidents in the incident backlog, a breakdown of the incident backlog by geographical region, and a percentile ranking of the incident backlog compared to the incident backlogs of other managed networks.

Benchmarks button 621 may include a link to an additional dashboard containing percentile ranks for the various KPIs. The percentile ranks may be determined by (i) gathering KPI values from multiple managed networks via multiple computational instances of the remote network management platform, and (ii) comparing the KPI values to determine the percentage of KPI values that are equal to or less/greater than the KPI value of a particular managed network. This may allow a managed network to compare its KPIs to related KPIs of other managed networks. This may be beneficial because managed networks might not typically have KPI data relating to other managed networks.

After viewing the various scorecards related to the "Customer Experience" tab in dashboard 600, a user may select the "Performance" tab in tabs 806. When the user makes this selection, the user is presented with a different variation of dashboard 600.

Figure 6B:
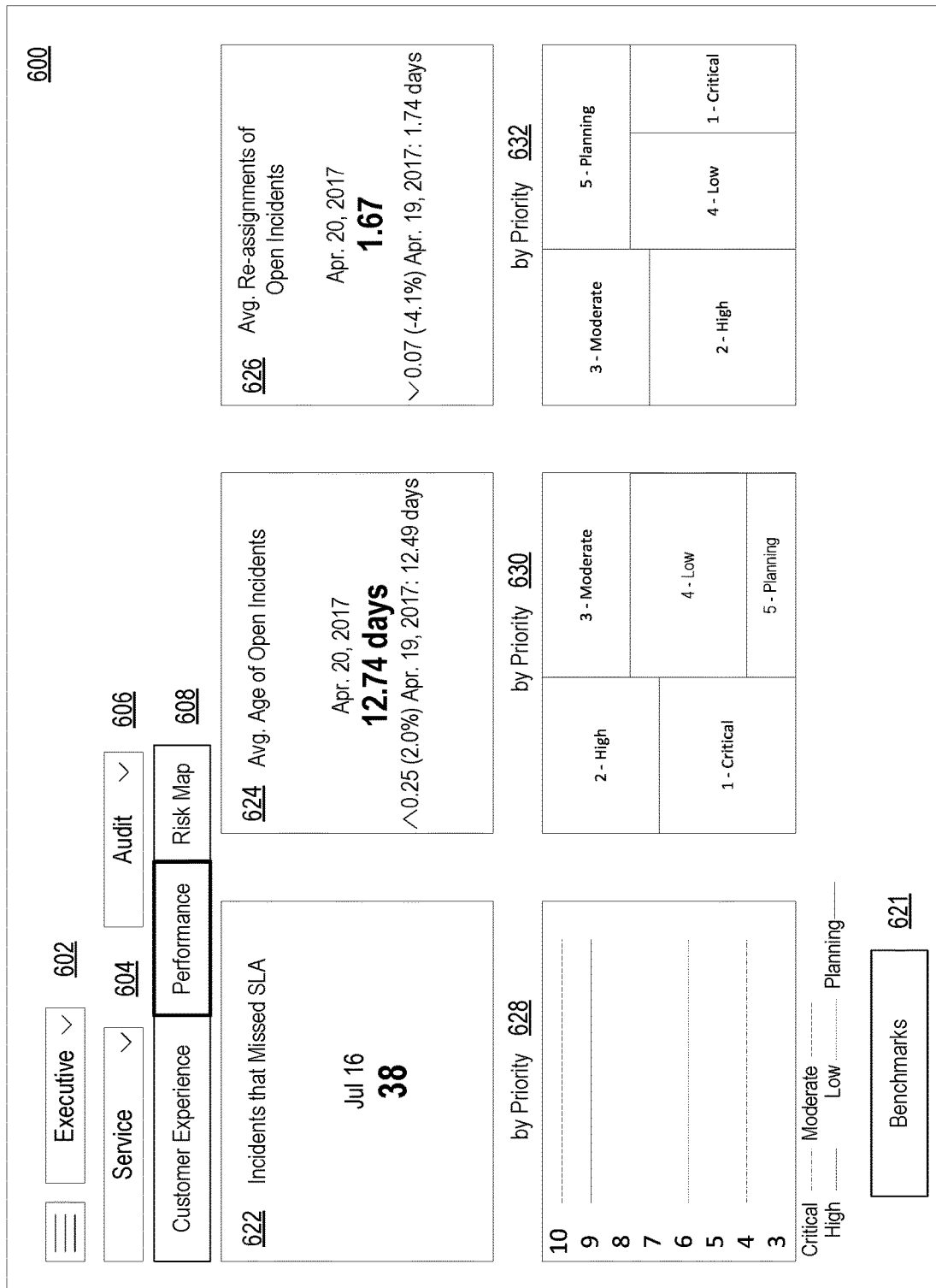
FIG. 6B depicts a dashboard also showing KPIs at the first level, in accordance with example embodiments.

Dashboard 600 of FIG. 6B includes the same drop down menus 602, 604, and 606, tabs 608, and benchmarks button 621. However, dashboard 600 of FIG. 6B additionally displays scorecards 622, 624, and 626, along with priority displays 628, 630, and 632.

Scorecards 622, 624, and 626 include KPIs relating to the user's selections within drop down menus 602, 604, and 606, with an emphasis on particular KPIs. Scorecards 622, 624, and 626 may include KPIs such as incidents that missed their respective SLAs, average age of open incidents, and average re-assignments of open incidents. Incidents that missed SLA might include the number of incidents that are not resolved within a time period specified by an SLA. Average age of open incidents is the average time from when an incident ticket is opened to when it is resolved (e.g., 10 days from ticket opening to resolution). The average re-assignments of open incidents is the average amount of times an incident is assigned to a new agent. For example, an incident may be opened and assigned to a particular agent, and then the incident may be re-assigned to a different agent.

Priority displays 628, 630, and 632 display the priority breakdown for each KPI shown in scorecards 622, 624, and 626. The priority break down may be a chart as shown in priority display 628, or a heat map as shown in priority displays 630 and 632. The chart shown in priority display 628 shows their respective number of critical, high, moderate, low and planning incidents that have missed SLA (the KPI in scorecard 622). As shown, there are 10 moderate priority incidents that have missed SLA, 9 planning, 6 low, 0 high, and 4 critical priority incidents. The heat map shown in priority display 630 shows the average age of open incidents by priority, indicated by the size of the box. For instance, the larger the box, the higher number of incidents in that priority category. As shown, the average age of open incidents for low priority incidents is the highest, while planning incidents is the lowest.

Once a user has viewed the information in dashboard 600 in FIG. 6B, the user may select the "Risk Map" tab in tabs 608. While not shown, the "Risk Map" tab may display a breakdown of critical incidents, problems, and requests, and the groups to which they belong. This breakdown may be in the form of a heat map displaying the number of critical incidents, problems, and requests for each service, incident category, and assignment group. The data in the "Risk Map" tab may be related to the user's selections within drop down menus 602, 604, and 606.

After viewing the "Performance tab" in tabs 608, a user may want to access the percentile ranks for the KPIs displayed in dashboard 600 of FIG. 6A and FIG. 6B. To view the percentile ranks, a user may select benchmarks button 621 benchmarks button 621 to open an additional dashboard 600 in FIG. 6C.

Figure 6C:
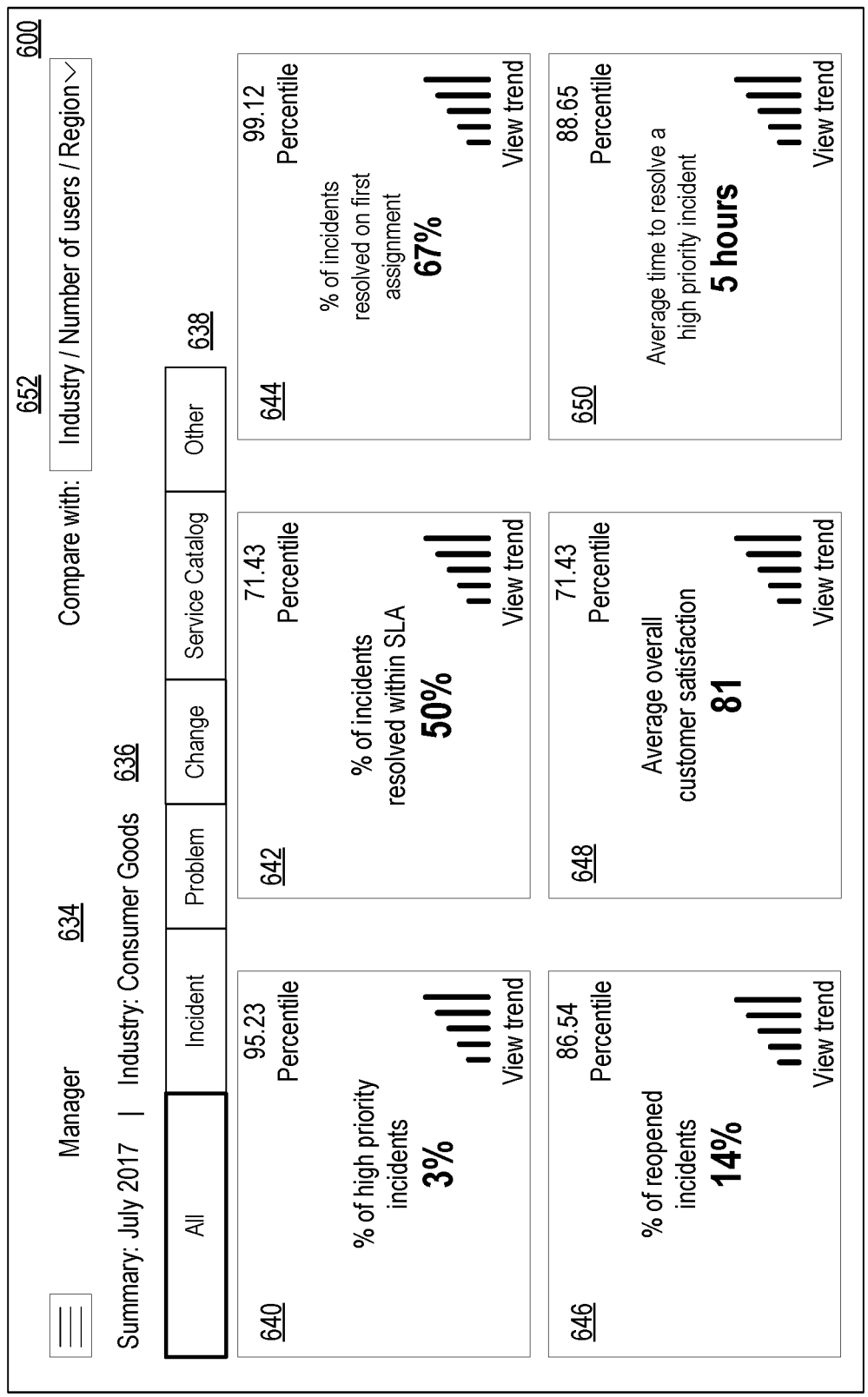
FIG. 6C depicts a dashboard showing KPIs at a second level, in accordance with example embodiments.

Dashboard 600 of FIG. 6C includes title 634, status 636, tabs 638, scorecards 640, 642, 644, 646, 648, and 650, and drop down menu 652. Title 634 may include the service or group to which the KPIs in dashboard 600 relate. Title 634 indicates the KPIs relate to a manager servicing managed network 300.

Tabs 638 include tabs for "all," "incident," "problem," "change," "service catalog," and "other." The "all" tab may display all scorecards available for viewing and selection in dashboard 600 of FIG. 6C. The "incident" tab may display the scorecards related to incident management. The "problem" tab may display the scorecards related to problem management. The "change" tab may display the scorecards related to change management. The "service catalog" tab may display the scorecards related to customers' requests. The "other" tab may display miscellaneous scorecards related to the network managers overall service of managed network 300. In operation, selecting one of tabs 638 may change the scorecards that are displayed in dashboard 600 of FIG. 6C. For instance, if a user selects the "incident" tab in tabs 638, scorecards 640, 642, 644, 646, 648, and 650 may change to reflect KPIs related to incidents within managed network 300.

Scorecards 640, 642, 644, 646, 648, and 650 in FIG. 6C may display similar KPI information as scorecards 610, 612, 614, 616, 618, and 620 in FIG. 6A, with additional information such as the percentile rank compared to other managed networks.

Scorecard 640 may include the KPI of the percentage of high priority incidents. The percentage of high priority incidents may be the percentage of newly opened incidents that are assigned a high priority. An incident may be assigned a high priority when resolution of the incident is needed in a short time frame (but not as short a time from as a P1 or critical incident). Scorecard 640 also displays the percentile rank for the network mangers' percentage of high priority incidents compared to other managed networks. As shown in dashboard 600 of FIG. 6C, the managed network is in the 95.23 percentile for the KPI of percentage of high priority incidents.

Figure 6D:
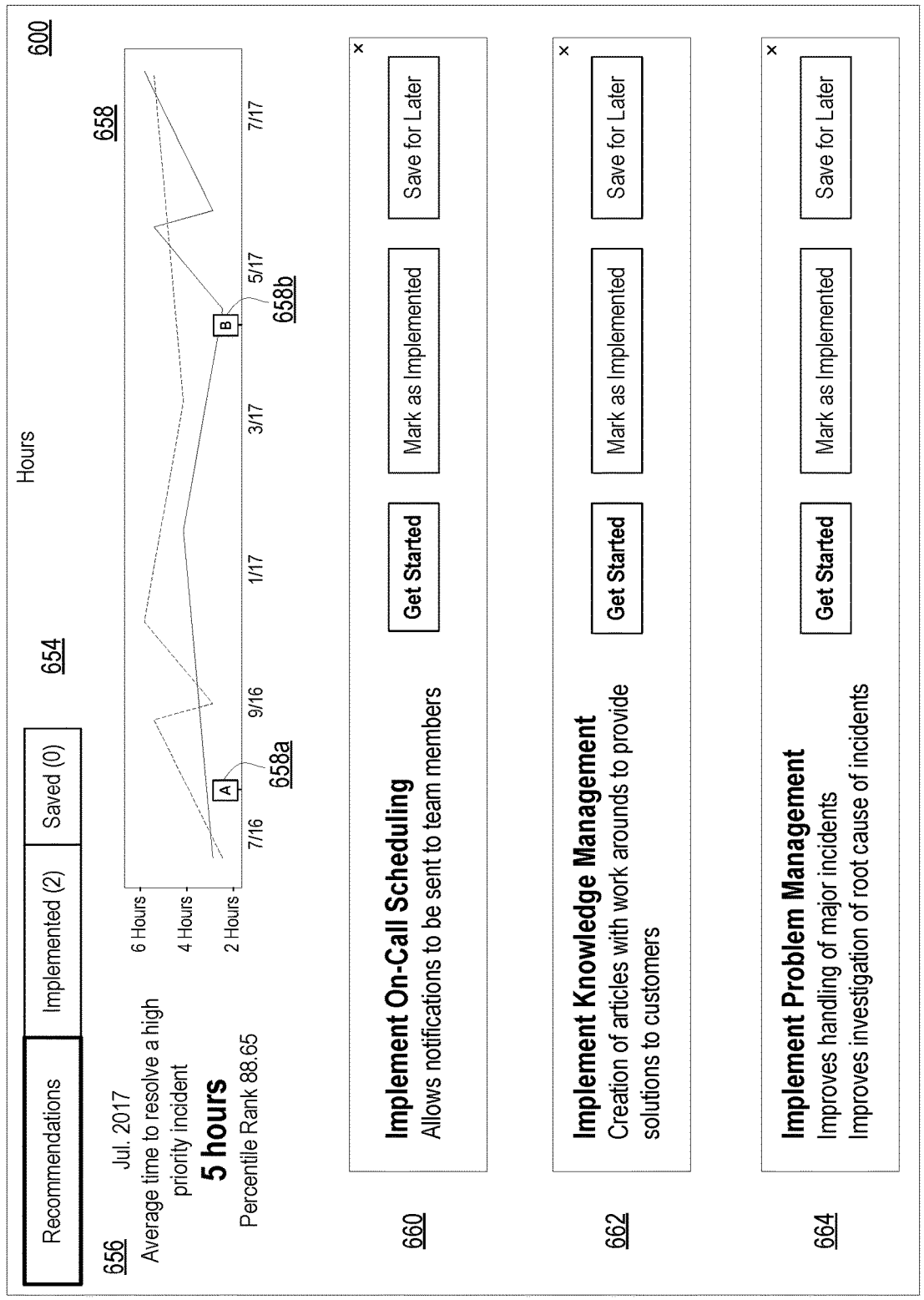
FIG. 6D depicts a dashboard showing recommendations for improving KPIs, in accordance with example embodiments.

Scorecard 640 may additionally have a selectable "view trend" button. In operation, when a user selects the "view trend" button, an additional dashboard 600 may displayed, as shown in FIG. 6D.

Still referring to FIG. 6C, scorecard 642 may include the KPI of the percentage of incidents resolved within SLA. The percentage of incidents resolved within SLA may represent the percentage of incidents that have been resolved within the appropriate service-level agreement. Scorecard 642 also shows that the managed network is in the 71.43 percentile for this KPI. Similar to scorecard 640, scorecard 642 also has a "view" trend button the user may select.

Scorecard 644 may include the KPI of the percentage of incidents resolved on first assignment. The percentage of incidents resolved on first assignment may be the percentage of opened incidents that are resolved by the first agent to which it was assigned. Scorecard 644 shows the managed network is in the 99.12 percentile for this KPI.

Scorecard 646 may include the KPI for the percentage of reopened incidents. The percentage of reopened incidents may be the percentage of incidents that were closed but later reopened. Scorecard 646 shows the 14% of incidents were reopened. Scorecard 646 indicates this in the 86.54 percentile when compared to other managed networks.

Scorecard 648 may include the KPI for the average overall customer satisfaction. The average overall customer satisfaction may include an aggregated rating of all customers in managed network 300. For instance, turning to FIG. 3, when a problem or incident is resolved, the individual that opened the incident may electronically receive an evaluation form. The evaluation form may contain a field asking the individual to rate the service on a scale from 1-100. Once the individual completes and submits the evaluation, the computational instance may compile the results. Scorecard 648 shows an average overall customer satisfaction of 81, which is in the 71.43 percentile when compared to other managed networks.

Scorecard 650 may include the KPI for the average time to resolve a high priority incident. The average time to resolve a high priority incident may be the mean amount of time (e.g., days, hours and/or minutes) it takes network managers to resolve an incident that was labeled as high priority. Scorecard 650 shows the manage network's average time to resolve a high priority incident is 5 hours, which is in the 88.65 percentile when compared to other managed networks.

The KPIs in scorecards 640, 642, 644, 646, 648, and 650 may be further filterable by drop down menu 652. Drop down menu 652 may allow network managers to filter the KPIs in the scorecards by industry, number of users, and/or geographical region. In operation, selecting any of the options in drop down menu 652 may change the scorecards displayed or the data contained within the scorecards. Drop down menu 652 may include options to filter KPIs by industry, including "Services," "Consumer Goods," "Education," and "Energy." Other industries may exist depending on the type of industry to which managed network 300 is related. Drop down menu 652 may also include options to filter KPIs by number of users, which may include options such as "1-1,000," "1,001-5,000," "5,001-10,000," "10,001-50,000," and ">50,000." Drop down menu 652 may further include options to filter KPIs by geographical region, including options to filter KPIs by country, state, and/or city.

In some circumstances, a user may be interested in viewing the trend of a particular KPI over a period of time because it may indicate trends in the performance of the managed network. To view this information, a user may select the "view trend" button on any of scorecards 640, 642, 644, 646, 648, and 650. In operation, selecting the "view" trend button may open dashboard 600 in FIG. 6D.

Dashboard 600 of FIG. 6D includes tabs 654, KPI information 656, KPI trend graph 658, and recommendations 660, 662, 664. Tabs 654 may include a "Recommendations" tab, "Implemented" tab, and "Saved" tab. The "Recommendations" tab may display KPI information 656 and KPI trend graph 658, as well as recommendations to improve their KPIs or percentile ranks. The "Implemented" tab may include the recommendations that have previously implemented from the "Recommendations" tab. The "Saved" tab may include recommendations that have been saved to analyze and implement at a later time.

KPI information 656 may relate to the KPI on the scorecard selected by the user in FIG. 6C. Dashboard 600 of FIG. 6D displays the KPI information as shown to a user that selected scorecard 650 of FIG. 6C. KPI information 656 may contain the same information as scorecard 650 (e.g., 5 hours is the average time to resolve a high priority incident, which is the 88.65 percentile when compared to other managed networks).

KPI trend graph 658 may include a graph comparing the managed network's KPI over time to a global benchmark KPI that includes KPI data from other managed networks. KPI trend graph 658 may include implementation indicators 658a and 658b. Implementation indicators 658a and 658b may display the points in time a managed network began implementing a recommendation. For example, as shown, a managed network implemented recommendations in August 2016 and April 2017. These implementation indicators may be beneficial as they may allow a managed network to view the change in KPI information 656 via dashboard 600 after implementing the recommendation. In FIG. 6D, KPI trend graph 658 shows the managed network's KPI data as a dotted line and the global KPI data as a solid line. KPI trend graph 658 indicates the average time to resolve a high priority incident over the time period from July 2016 to July 2017. As shown, the average time to resolve a high priority incident has increased for both the network managers and the global benchmark, with the network managers having a slightly lower average time than the global benchmark, resulting in a relatively high percentile ranking for this KPI.

As noted above, recommendations 660, 662, and 664 may include procedures to improve KPIs and/or percentile ranks. Recommendations 660, 662, and 664 may be generated by remote network management platform 320 in response to analyzing the service data and KPIs of the one or more managed networks. Remote network management platform 320 may contain a recommendation engine that dynamically chooses recommendations based on KPI data. The recommendation engine may be configurable to provide recommendations based on particular KPI values or combinations of KPI values.

For example, an operator of remote network management platform 320 may configure the recommendation engine to (i) look up the KPI data of the network managers, (ii) determine the KPI data satisfies particular criteria, and (iii) based on determining the KPI data satisfying the criteria, provide one or more recommendations for implementation by the managed network.

The recommendation engine may determine the KPI data satisfies particular criteria. The criteria may include one or more thresholds for each KPI, which may be configurable. For example, the KPI data for the average age of open incidents may satisfy the particular criteria if the average age is above 12 days. In another example, the KPI data for percentage of new critical problems may satisfy the particular criteria if the percentage is above 15%.

The recommendation engine may, based on determining the KPI satisfies the particular criteria, recommend one or more recommendations for implementation by the network managers. The one or more recommendations may include implementing services, such as on-call scheduling, implementing service level management, knowledge management, problem management, a configuration management database (CMDB), and/or a virtual agent. These services may improve the KPI data by providing IT services and resources that result in a stream-lined service experience. The recommendation engine, after generating the recommendations described above, may rank the recommendations. This may be beneficial because it allows dashboard 600 to provide a managed network with the recommendations in an order tailored to the managed network. The recommendation engine may rank the recommendations based on a normalized weightage score calculation that takes into account certain weights, KPI values, and impact each service may have on the KPI. The weights may be configurable based on factors such as a managed network's likelihood to implement a service, the managed network's capability to implement a service, and/or ease of implementation of the service. Other factors may exist. The KPI values may include the KPI value shown in KPI information 656. The impact may be an expected impact the KPI value will experience after implementing a particular service. After ranking the recommendations, the recommendation engine may transmit the recommendations to the network managers via dashboard 600 within computational instance 322 of remote network management platform 320.

As an example, recommendation 660 may include (i) the recommended service, (ii) a brief description of the service, and (iii) implementation options. As shown, recommendation 660 displays the recommend service of on-call scheduling. On-call scheduling may implement a service, which an "on-call" manager or agent is notified (e.g., by an email, text message, an/or phone call) when an incident is opened. This may allow the network manager or agent to more quickly resolve an incident, lowering their KPIs related to an average time to resolve incidents. The brief description of on-call scheduling may include "allows notifications to be sent to team members," informing the network managers the effect of implementing the service. The implementation options may include options such as "Get Started," "Mark as Implemented," "Save for Later," and/or a reject option displayed in the form of an "X" in the top right corner of recommendation 660.

In operation, selection of the "Get Started" option may display an additional dashboard (not shown) that provides steps that can be followed to implement the on-call scheduling service. Selection of the "Mark as Implemented" option may remove the service from "Recommendations" tab and display the service in the "Implemented" tab, indicating the recommended service has been implemented. In response to a selection of "Get Started" or "Mark as Implemented," KPI trend graph 658 may be updated to display implementation indicators 658a and 658b. For example, if in July 2017 a managed network selects "Mark as Implemented" in recommendation 660, a new implementation indicator (not shown) may appear on KPI trend graph 658 to indicate recommendation 660 was implemented in July 2017. This may be beneficial as it allows a managed network to see the change in a KPI after implementation of a particular service. Selection of the "Save for Later" tab may remove the service from the "Recommendation" tab and display the service in the "Saved" tab, indicating the service may be implemented at a later point in time. Selection of the "X" to reject the service may remove the service from the "Recommendation" tab and may cause dashboard 600 to refrain from displaying the service in future recommendations.

Recommendation 662 may include the option to implement the service of knowledge management. Knowledge management may include a service wherein articles are created to assist customers, resulting in a lower number of opened incidents or problems. For example, the articles may include troubleshooting steps for common incidents or problems such as "How to reset a router" or "Installing updates." Recommendation 662 may contain the same implementation options as recommendation 660.

Recommendation 664 may include the option to implement the service of problem management. Problem management may include a service in which the network managers are trained to handle major incidents or more efficiently investigate the root cause of incidents. Recommendation 664 may contain the same implementation options as recommendations 660 and 662.

Figure 7:
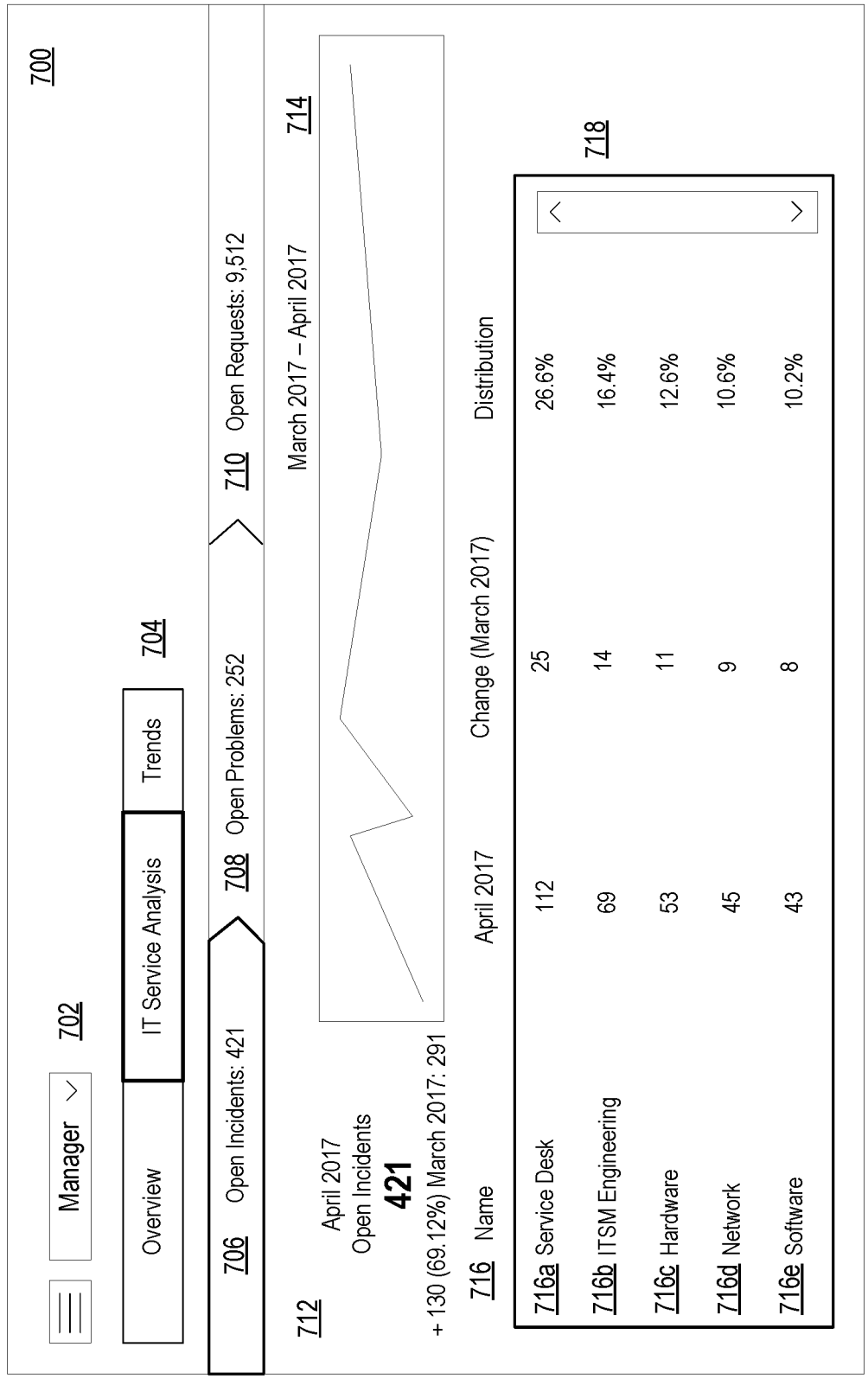
FIG. 7 depicts a dashboard also showing KPIs at the second level, in accordance with example embodiments.

In some circumstances, after determining whether to implement the recommended services, it may be desirable to view the KPIs for a different level of employee (e.g., a manager or agent). Turning back to FIG. 6A, a user (provided the user has permission to do so) may select "Manager" from drop down menu 602. In response to selecting "Manager" in drop down menu 602, the remote network management platform 320 may display dashboard 700 as shown in FIG. 7 via computational instance 322.

Dashboard 700 that displays information related to a manager the network managers. Specifically, dashboard 700 includes drop down menu 702, tabs 704, KPI bars 706, 708, and 710, KPI detailed view 712, graph 714, table 716 with table rows 716a-e, and slider 718.

Drop down menu 702 provides the user with similar functionality as drop down menu 602 in FIGS. 6A and 6B. Specifically, drop down menu 702 allows a user to select the level of employee for which to display a dashboard. Drop down menu 702 includes options such as "Executive," "Manager," and "Agent." In operation, if a user selects "Executive" from drop down menu 702, dashboard 600 as shown in FIGS. 6A and 6B is displayed.

Tabs 704 function similarly to tabs 608 in FIGS. 6A and 6B, but are tailored to provide information related to a manager. Tabs 704 include an "Overview" tab, "IT Service Analysis" tab, and a "Trends" tab. Dashboard 700 in FIG. 7 displays the dashboard with the "IT Service Analysis" tab selected.

KPI bars 706, 708, and 710 provide the user the ability to view data relating to open incidents, problems, and requests. Specifically, KPI bar 706 relates to open incidents, KPI bar 708 relates to open problems, and KPI bar 710 relates to open requests. When a user selects KPI bar 706, as shown in FIG. 7, dashboard 700 displays KPI detailed view 712.

KPI detailed view 712 includes additional information related to KPI bar 706, such as (i) the time range of open incidents, (ii) the number of open incidents, (iii) the trend in open incidents over a period of time, and (iv) the percentile rank of open incidents compared to similar KPIs from other managed networks. For example, in FIG. 7, KPI detailed view 712 displays that there are 421 open incidents as of April 2017. Further, KPI detailed view 712 displays there are 130 new incidents since March 2017, which is a 69.12% increase. This increase may be expected if the managed network has expanded or added new devices/systems to maintain.

Graph 714 displays the change in KPI value over time. For example, the time range for graph 714 is March 2017-April 2017. In FIG. 7, graph 714 shows an increase of open incidents from 291 open incidents to 421 open incidents from March 2017-April 2017. Graph 714 changes depending on the user selection within KPI bars 706, 708, and 710. For example, graph 714 may display the change in open problems over the same or different time range if the user selects KPI bar 708.

Table 716 and table rows 716a-e include a breakdown of the KPI values across different incident groups, including the number of open incidents in an incident group for a particular time, the change in the number of open incidents in the incident group over a time range, and the distribution of open incidents for each incident group.

For example, table row 716c shows the number of open incidents for the hardware incident category (53), the change in the number of open incidents in the hardware incident category (11 since March 2017), and that the hardware incident category represents 12.6% of all open incidents within KPI bar 706. In another example, table row 716e shows the number of open incidents for the software incident category (43), the change in the number of open incidents in the software incident category (8), and that the software incident category represents 10.2% of all open incidents within KPI bar 706.

Slider 718 may assist the user in viewing the breakdown of all incident categories. For example, FIG. 7 only shows incident categories representing 312 of the total 421 open incidents. A user can use slider 718 to scroll down and view the remaining incident categories and their respective open incidents.

While not shown, the user may select the "Overview" or "Trends" tab in tabs 704. The "Overview" tab may display a dashboard similar to dashboard 600 in FIG. 6A, with an emphasis on KPIs relevant to a manager. For example, the scorecards presented to the user may include KPIs such as open unassigned incidents, service desk open problems, planned changes, open workload backlog, new workload, and closed work load. The open unassigned incidents KPI may relate to the number of incidents that have been opened but not assigned to an agent. The service desk open problems KPI may relate to the total number of open problems the manager is overseeing. The planned changes KPI may relate to the number of changes the manager will implement in the next week. The open workload backlog KPI may relate to the number of total open incidents, problems, and requests the manager has no yet resolved. The new and closed workload KPIs may relate to the number of new/closed incidents, problems, and requests in the last week.

When a user selects the "Trends" tab, a dashboard may be displayed showing KPI information over a time period, such as the last year. For example, the dashboard may display the increase/decrease in workload backlog growth over the last year or the increase/decrease in the average resolution time of incidents over the last year.

Figure 8A:
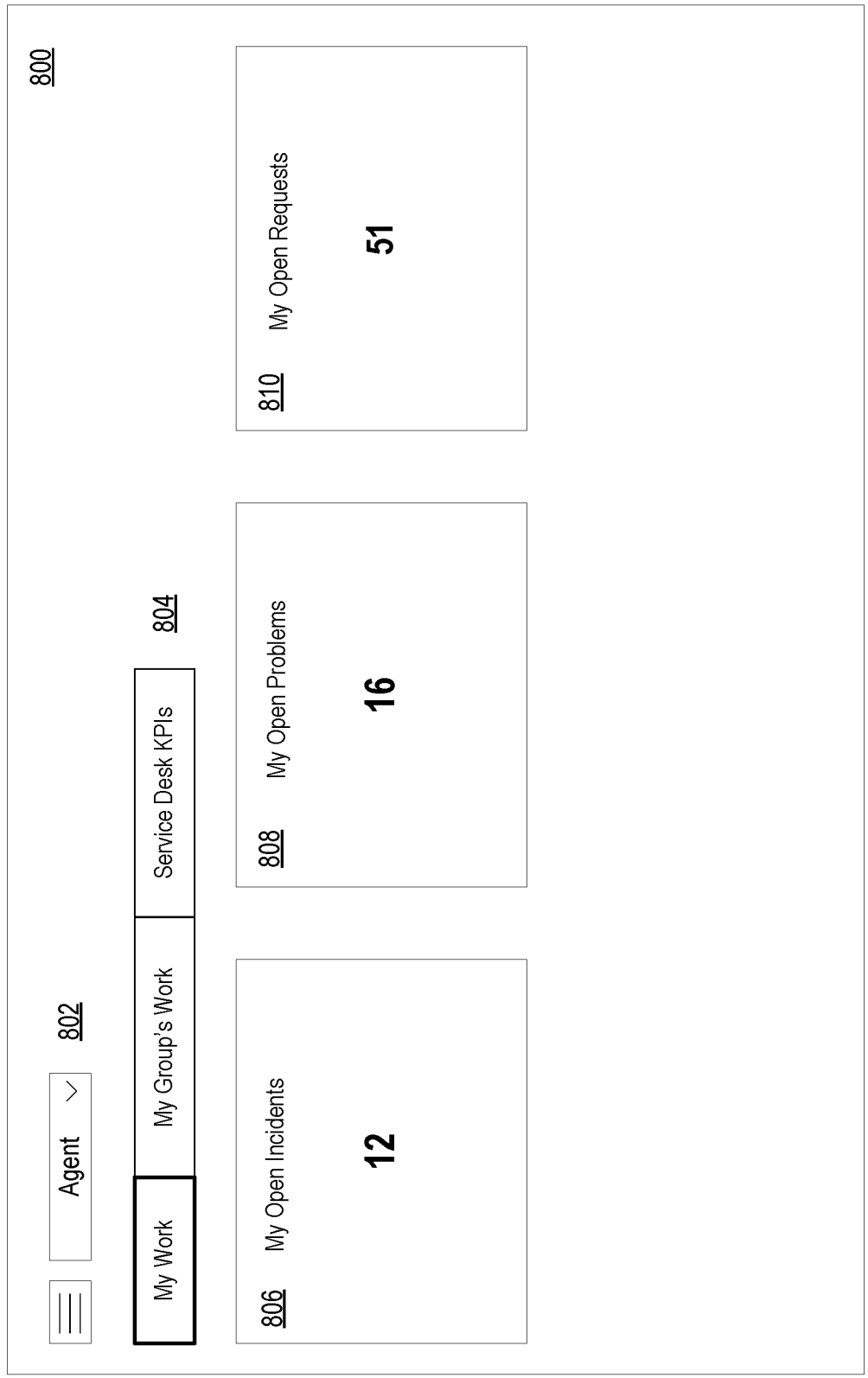
FIG. 8A depicts a dashboard showing KPIs at a third level, in accordance with example embodiments.

FIG. 8A depicts a dashboard 800 that displays information related to agent. Specifically, dashboard 800 includes drop down menu 802, tabs 804, and scorecards 806, 808, and 810.

Drop down menu 802 provides the user with similar functionality as drop down menus 602 and 702. Specifically, drop down menu 802 allows a user to select the level of employee for which to display a dashboard. Drop down menu 802 includes options such as "Executive," "Manager," and "Agent." In operation, if a user selects "Executive" from drop down menu 802, dashboard 600 as shown in FIGS. 6A and 6B may displayed. Alternatively, if a user selects "Manager" from drop down menu 802, dashboard 700 as shown in FIG. 7 may be displayed. FIGS. 8A and 8B show dashboard 800 when a user selects "Agent" from drop down menu 802.

Tabs 804 may function similarly to tabs 704 in FIG. 7, but may be tailored to provide information related to an agent. Tabs 804 include an "My Work" tab, "My Group's Work" tab, and a "Service Desk KPIs" tab. Dashboard 800 in FIG. 8A displays the dashboard with the "My Work" tab selected.

Scorecards 806, 808, and 812 include KPIs relating to the user's selections within drop down menus 802 and tabs 804. As shown in FIG. 8A, a user has selected the "My Work" tab in tabs 804. Scorecards 806, 808, and 812 may include KPIs such as "My Open Incidents," "My Open Problems," and "My Open Requests." While the previously described dashboard 600 and 700 display KPIs relating to executives and managers, these KPIs are specific to the agent accessing dashboard 800. Scorecards 806, 808, and 812 may contain the number of open incidents, problems, and requests for the agent accessing dashboard 800.

Dashboard 800 in FIG. 8B is displayed when a user selects the "My Group's Work" tab in tabs 804. Dashboard 800 in FIG. 8B may include the same drop down menu 802 and tabs 804 as dashboard 800 in FIG. 8A with the addition of table 812, table rows 812*a-j*, and KPI snapshot 814.

Table 812 contains all open incidents for the agent's group. The agent's group may consist of one or more agents including the agent accessing dashboard 800. Table 812 and table rows 812*a-j* may contain information such as incident number, description, category, priority, service, and date of opening. For example, table row 812*c* may include incident number "INC06751," incident description "Management app is running slow," incident category "Software," incident priority "1—Critical," service "Purchase History," and incident opening of "2017-03-30." The information in table 812 and table rows 812*a-j* may assist in providing the agent context of the other types of incidents his group is handling.

KPI snapshot 814 may provide the agent with a high-level view of the total number of critical incidents, open incidents, open requests, and open problems the agent's group is handling. This information may be beneficial in that it allows the agent to see how many incidents he or she is handling compared to the total number for the group.

While not shown, a user may select the "Service Desk KPIs" tab in tabs 804. This selection may present an alternative dashboard 800 to the user that includes KPIs related to the service desk (e.g., network managers) as a whole. For example, selecting the "Service Desk KPIs" tab may display scorecards with KPIs such as the real-time incident backlog for the service desk, the average resolution time of incidents, and the first call resolution rate. The real-time incident backlog may relate to the current number of open, unresolved incidents assigned to the service desk. The average resolution time of incidents may refer to the number of days in which it takes the service desk to resolve a new incident. Finally, the first call resolution rate may relate to the percentage an incident is resolved with only one call or ticket. For example, if 10 users open a ticket for various incidents, and only one user needs to resubmit a ticket before resolution, the first call resolution rate is 90%. This information may be beneficial to the agent because it allows them to compare their own work with the average for the service desk.

The dashboards and graphical user interfaces of FIGS. 6A-B, 7, and 8A-8B are examples, and different dashboard and/or graphical user interfaces with different arrangements of information could be used and are contemplated herein.

VI. EXAMPLE OPERATIONS

Figure 9:
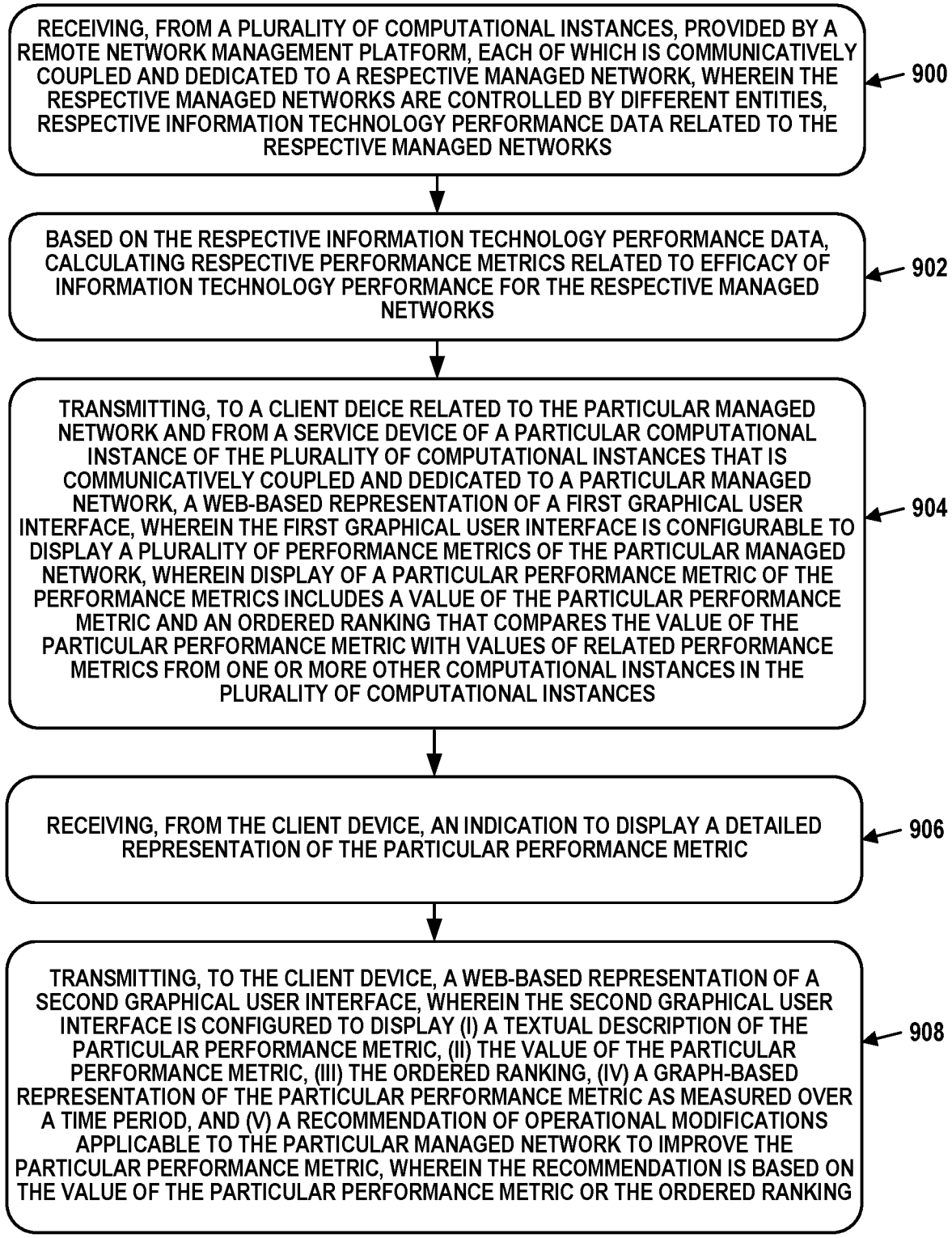
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

In accordance with these embodiments, one or more databases may be disposed within a remote network management platform. The one or more databases may include a data model that represents configuration and operational characteristics of computing devices disposed within a managed network. The managed network may be managed by network managers. The configuration and operational characteristics may include KPIs related to the managed network. Additionally, one or more server devices may be disposed within the remote network management platform. These servers may be configured to carry out the following operations.

Block 900 may involve receiving, from a plurality of computational instances, provided by a remote network management platform, each of which may be communicatively coupled and dedicated to a respective managed network. The respective managed networks may be controlled by different entities, respective information technology performance data related to the respective managed networks.

Block 902 may involve, based on the respective information technology performance data, calculating respective performance metrics related to efficacy of information technology performance for the respective managed networks.

Block 904 may involve transmitting, to a client device related to the particular managed network and from a service device of a particular computational instance of the plurality of computational instances that is communicatively coupled and dedicated to a particular managed network, a web-based representation of a first graphical user interface. The first graphical user interface may be configurable to display a plurality of performance metrics of the particular managed network. Display of a particular performance metric of the performance metrics may include a value of the particular performance metric and an ordered ranking that compares the value of the particular performance metric with values of related performance metrics from one or more other computational instances in the plurality of computational instances.

Block 906 may involve receiving, from the client device, an indication to display a detailed representation of the particular performance metric.

Block 908 may involve transmitting, to the client device, a web-based representation of a second graphical user interface. The second graphical user interface may be configured to display (i) a textual description of the particular performance metric, (ii) the value of the particular performance metric, (iii) the ordered ranking, (iv) a graph-based representation of the particular performance metric as measured over a time period, and (v) a recommendation of operational modifications applicable to the particular managed network to improve the particular performance metric. The recommendation is based on the value of the particular performance metric or the ordered ranking.

In some embodiments, the display of the particular performance metric on the first graphical user interface may be in the form of a card that contains: (i) the textual description of the particular performance metric, (ii) the value of the particular performance metric, (iii) the ordered ranking, and (iv) a selectable hyperlink to view the second graphical user interface.

In some embodiments, the card may be rectangular. The description of the particular performance metric and the value of the particular performance metric may be disposed about a center of the card. The ordered ranking may be disposed about a first corner of the card and the selectable hyperlink may be disposed about a second corner of the card.

In some embodiments, the ordered ranking can be filtered by criteria including type of industry, size of organization, and geographical region. The ordered ranking as filtered may include only related performance metrics from other managed networks that meet the criteria.

In some embodiments, the recommendation of operational modifications may be one of a plurality of displayed recommendations of operational modifications applicable to the particular managed network to improve the particular performance metric.

In some embodiments, the recommendation of operational modifications may include an implementation button that, when activated, causes the second graphical user interface to further display of instructions related to carrying out the operational modifications.

In some embodiments, the recommendation of operational modifications may include a mark-as-complete button that, when activated, causes the recommendation to be removed from the second graphical user interface and categorized as implemented.

In some embodiments, the second graphical user interface may include a selectable tab that, when selected, causes the second graphical user interface to display all recommendations that are categorized as implemented.

In some embodiments, the recommendation of operational modifications may include a save button that, when activated, causes the recommendation to be removed from the second graphical user interface and categorized as saved.

In some embodiments, the second graphical user interface may include a selectable tab that, when selected, causes the second graphical user interface to display all recommendations that are categorized as saved.

In some embodiments, the recommendation being based on the particular performance metric or the ordered ranking may include the value of the performance metric being below a predefined threshold value.

In some embodiments, the recommendation being based on the particular performance metric or the ordered ranking may include the ordered ranking being below a predefined threshold value.

In some embodiments, the ordered ranking may include a percentile rank that reflects a comparison of the particular performance metrics with related performance metrics from the one or more other computational instances of the plurality of computational instances.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a plurality of servers comprising one or more processors;
a plurality of computational instances, provided by a remote network management platform, wherein each of the plurality of computational instances runs on a respective server of the plurality of servers and is communicatively coupled and dedicated to a respective managed network, wherein the respective managed networks are controlled by different entities, and wherein the computational instances are configured to:
receive respective information technology performance data related to the respective managed networks; and
based on the respective information technology performance data, calculate respective performance metrics related to efficacy of information technology performance for the respective managed networks; and
a particular computational instance of the plurality of computational instances that is communicatively coupled and dedicated to a particular managed network, wherein a particular server of the plurality of servers on which the particular computational instance runs is configured to:
transmit, to a client device related to the particular managed network, a web-based representation of a first graphical user interface, wherein the first graphical user interface is configurable to display a plurality of performance metrics of the particular managed network, wherein display of a particular performance metric of the performance metrics includes a value of the particular performance metric and an ordered ranking that compares the value of the particular performance metric with values of related performance metrics from one or more other computational instances in the plurality of computational instances;
determine, with a recommendation engine, that the particular performance metric of the performance metrics satisfies a particular criteria;
generating a plurality of recommendations based on the determination;
receive, from the client device, an indication to display a detailed representation of the particular performance metric; and
transmit, to the client device, a web-based representation of a second graphical user interface,
wherein the second graphical user interface is configured to display (i) a textual description of the particular performance metric, (ii) the value of the particular performance metric, (iii) the ordered ranking, (iv) a graph-based representation of the particular performance metric as measured over a time period, and (v) the plurality of recommendations of operational modifications simultaneously,
wherein each of the plurality of recommendations is applicable to the particular managed network to improve the particular performance metric,
wherein each of the recommendations is based on the value of the particular performance metric or the ordered ranking, and
wherein each of the recommendations simultaneously displays a first button that, when selected, implements the recommendation, a second button that, when selected, marks the recommendation as implemented, and a third button that, when selected, saves the recommendation for future implementation,
wherein implementing the recommendation comprises displaying an additional dashboard that displays steps a user can take to implement the recommendation.

2. The system of claim 1, wherein the display of the particular performance metric on the first graphical user interface is in the form of a card that contains: (i) the textual description of the particular performance metric, (ii) the value of the particular performance metric, (iii) the ordered ranking, and (iv) a selectable hyperlink to view the second graphical user interface.

3. The system of claim 2, wherein the card is rectangular, wherein the textual description of the particular performance metric and the value of the particular performance metric are disposed about a center of the card, wherein the ordered ranking is disposed about a first corner of the card, and wherein the selectable hyperlink is disposed about a second corner of the card.

4. The system of claim 1, wherein the ordered ranking can be filtered by criteria including type of industry, size of organization, and geographical region, and wherein the ordered ranking as filtered includes only related performance metrics from other managed networks that meet the criteria.

5. The system of claim 1, wherein the recommendation of operational modifications is one of a plurality of displayed recommendations are representative of operational modifications applicable to the particular managed network to improve the particular performance metric.

6. The system of claim 1, wherein the recommendation of operational modifications includes a mark as complete button that, when activated, second button, when selected, causes the respective recommendation to be removed from the second graphical user interface and categorized as implemented.

7. The system of claim 6, wherein the second graphical user interface includes a selectable tab that, when selected, causes the second graphical user interface to display all recommendations that are categorized as implemented.

8. The system of claim 1, wherein the recommendation of operational modifications includes a save button that, when activated, third button, when selected, causes the respective recommendation to be removed from the second graphical user interface and categorized as saved.

9. The system of claim 8, wherein the second graphical user interface includes a selectable tab that, when selected, causes the second graphical user interface to display all recommendations that are categorized as saved.

10. The system of claim 1, wherein the recommendation being based on the particular performance metric or the ordered ranking comprises the value of the performance metric being below a predefined threshold value.

11. The system of claim 1, wherein the recommendation being based on the particular performance metric or the ordered ranking comprises the ordered ranking being below a predefined threshold value.

12. The system of claim 1, wherein the ordered ranking comprises a percentile rank that reflects a comparison of the particular performance metrics with related performance metrics from the one or more other computational instances of the plurality of computational instances.

13. A method comprising:
receiving, from a plurality of computational instances, provided by a remote network management platform, each computational is communicatively coupled and dedicated to a respective managed network, wherein the respective managed networks are controlled by different entities, respective information technology performance data related to the respective managed networks;
based on the respective information technology performance data, calculating respective performance metrics related to efficacy of information technology performance for the respective managed networks;
transmitting, to a client device related to the particular managed network and from a service device of a particular computational instance of the plurality of computational instances that is communicatively coupled and dedicated to a particular managed network, a web-based representation of a first graphical user interface, wherein the first graphical user interface is configurable to display a plurality of performance metrics of the particular managed network,
wherein display of a particular performance metric of the performance metrics includes a value of the particular performance metric and an ordered ranking that compares the value of the particular performance metric with values of related performance metrics from one or more other computational instances in the plurality of computational instances;
determine, with a recommendation engine, that the particular performance metric of the performance metrics satisfies a particular criteria;
generating a plurality of recommendations based on the determination;
receiving, from the client device, an indication to display a detailed representation of the particular performance metric; and
transmitting, to the client device, a web-based representation of a second graphical user interface, wherein the second graphical user interface is configured to display (i) a textual description of the particular performance metric, (ii) the value of the particular performance metric, (iii) the ordered ranking, (iv) a graph-based representation of the particular performance metric as measured over a time period, and (v) a plurality of recommendations recommendation of operational modifications simultaneously,
wherein each of the plurality of recommendations is applicable to the particular managed network to improve the particular performance metric,
wherein each of the recommendation recommendations is based on the value of the particular performance metric or the ordered ranking, and
wherein each of the recommendations simultaneously displays a first button that, when selected, implements the recommendation, a second button that, when selected, marks the recommendation as implemented, and a third button that, when selected, saves the recommendation for future implementation,
wherein implementing the recommendation comprises displaying an additional dashboard that displays steps a user can take to implement the recommendation.

14. The method of claim 13, wherein the display of the particular performance metric on the first graphical user interface is in the form of a card that contains: (i) the textual description of the particular performance metric, (ii) the value of the particular performance metric, (iii) the ordered ranking, and (iv) a selectable hyperlink to view second graphical user interface.

15. The method of claim 14, wherein the card is rectangular, wherein the textual description of the particular performance metric and the value of the particular performance metric are disposed about a center of the card, wherein the ordered ranking is disposed about a first corner of the card, and wherein the selectable hyperlink is disposed about a second corner of the card.

16. The method of claim 13, wherein the ordered ranking can be filtered by criteria including type of industry, size of organization, and geographical region, and wherein the ordered ranking as filtered includes only related performance metrics from other managed networks that meet the criteria.

17. The method of claim 13, wherein the recommendation of operational modifications is one of a plurality of displayed recommendations are representative of operational modifications applicable to the particular managed network to improve the particular performance metric.

18. An article of manufacture including a non-transitory computer-readable medium, having stored thereon program instructions that, upon execution by a computing system, cause the computing system to perform operations comprising:
receiving, from a plurality of computational instances, provided by a remote network management platform, each computational is communicatively coupled and dedicated to a respective managed network, wherein the respective managed networks are controlled by different entities, respective information technology performance data related to the respective managed networks;
based on the respective information technology performance data, calculating respective performance metrics related to efficacy of information technology performance for the respective managed networks;
transmitting, to a client device related to the particular managed network and from a service device of a particular computational instance of the plurality of computational instances that is communicatively coupled and dedicated to a particular managed network, a web-based representation of a first graphical user interface, wherein the first graphical user interface is configurable to display a plurality of performance metrics of the particular managed network, wherein display of a particular performance metric of the performance metrics includes a value of the particular performance metric and an ordered ranking that compares the value of the particular performance metric with values of related performance metrics from one or more other computational instances in the plurality of computational instances;

determine, with a recommendation engine, that the particular performance metric of the performance metrics satisfies a particular criteria;

generating a plurality of recommendations based on the determination;

receiving, from the client device, an indication to display a detailed representation of the particular performance metric; and transmitting, to the client device, a web-based representation of a second graphical user interface, wherein the second graphical user interface is configured to display (i) a textual description of the particular performance metric, (ii) the value of the particular performance metric, (iii) the ordered ranking, (iv) a graph-based representation of the particular performance metric as measured over a time period, and (v) a plurality of recommendations of operational modifications simultaneously, wherein each of the plurality of recommendations is applicable to the particular managed network to improve the particular performance metric, wherein each of the recommendation recommendations is based on the value of the particular performance metric or the ordered ranking, and wherein each of the recommendations comprises a first button that, when selected, implements the recommendation, a second button that, when selected, marks the recommendation as implemented, and a third button that, when selected, saves the recommendation for future implementation, wherein implementing the recommendation comprises displaying an additional dashboard that displays steps a user can take to implement the recommendation.

* * * * *

UNITED STATES PATENT AND TRADEMARK OFFICE
CERTIFICATE OF CORRECTION

PATENT NO. : 10,699,237 B2
APPLICATION NO. : 15/786398
DATED : June 30, 2020
INVENTOR(S) : Manjeet Singh et al.

Page 1 of 1

It is certified that error appears in the above-identified patent and that said Letters Patent is hereby corrected as shown below:

In the Claims

Column 32, Claim 5, Lines 55-56, please delete the phrase "recommendation of operational modifications is one of a".

Column 32, Claim 6, Lines 60-62, please delete the phrase "recommendation of operational modifications includes a mark as complete button that, when activated,".

Column 33, Claim 8, Lines 3-5, please delete the phrase "recommendation of operational modifications includes a save button that, when activated,".

Column 34, Claim 13, Line 3, please delete the word "recommendations".

Column 34, Claim 13, Line 8, please delete the word "recommendation".

Column 36, Claim 18, Line 10, please delete the word "recommendation".

Signed and Sealed this
Eighth Day of December, 2020

Andrei Iancu
*Director of the United States Patent and Trademark Office*